United States Patent
Shinagawa (10) Patent No.: US 6,168,117 B1
(45) Date of Patent: *Jan. 2, 2001

(54) FLIGHT CONTROL SYSTEM FOR AIRPLANE

(75) Inventor: Takashi Shinagawa, Utsunomiya (JP)

(73) Assignee: Fuji Jukogyo Kabushiki Kaisha(JP)

(*) Notice: Under 35 U.S.C. 154(b), the term of this patent shall be extended for 0 days.

This patent is subject to a terminal disclaimer.

(21) Appl. No.: 09/371,604

(22) Filed: Aug. 10, 1999

Related U.S. Application Data (63) Continuation of application No. 08/882,405, filed on Jun. 25, 1997, now Pat. No. 5,984,240.

(30) Foreign Application Priority Data

Jul. 5, 1996 (JP) .................................................. 8-176755

(51) Int. Cl.[7] .................................................. B64C 13/16
(52) U.S. Cl. ........................... 244/195; 244/181; 701/3
(58) Field of Search ..................................... 244/194, 195, 244/177, 178, 179, 181, 191; 701/3, 4, 5, 8, 9, 11, 12

(56) References Cited

U.S. PATENT DOCUMENTS

| | | | |
|---|---|---|---|
| 2,595,309 | 5/1952 | Slater | 244/177 |
| 3,077,557 | 2/1963 | Joline et al. | 244/194 |
| 4,674,710 | 6/1987 | Rodriguez | 244/195 |
| 4,924,401 | 5/1990 | Bice et al. | 244/181 |
| 5,170,969 | 12/1992 | Lin | 244/194 |

*Primary Examiner*—Galen L. Barefoot
(74) *Attorney, Agent, or Firm*—Smith, Gambrell & Russell, LLP; Beveridge, DeGrandi, Weilacher & Young Intellectual Property Group (57) ABSTRACT

A flight control system according to the present invention includes a vertical acceleration control device for calculating a pitch axis steering angle command to make a difference between a vertical acceleration of an airplane and a target turn acceleration to zero, and transmitting it as a variable to a pitch axis control device, a reference bank angle device for calculating a reference bank angle from the target turn acceleration, an altitude control device for calculating a bank angle correcting quantity from a difference between an altitude of the airplane and a target altitude and obtaining a bank angle command by correcting the reference bank angle, and a roll axis control device for calculating a roll axis steering angle command for make a difference between a real bank angle and the bank angle command to zero and for transmitting it as a variable to a roll axis control device.

2 Claims, 9 Drawing Sheets

FLIGHT CONTROL SYSTEM FOR AIRPLANE

CROSS REFERENCE TO RELATED APPLICATION

This application is a continuation of allowed application Ser. No. 08/882,405 filed Jun. 25, 1997, now U.S. Pat. No. 5,984,240, which is incorporated herein in its entirety by reference thereto.

BACKGROUND OF THE INVENTION

1. Field of the Invention

The present invention relates to a flight control system for an airplane, particularly to a drone that is capable of holding a fixed radius, a fixed altitude and a fixed speed when making a steep turn, for use with an unmanned target plane to confirm and evaluate a target tracking capability of a missile or other system.

2. Related Background Art

Figure 8:
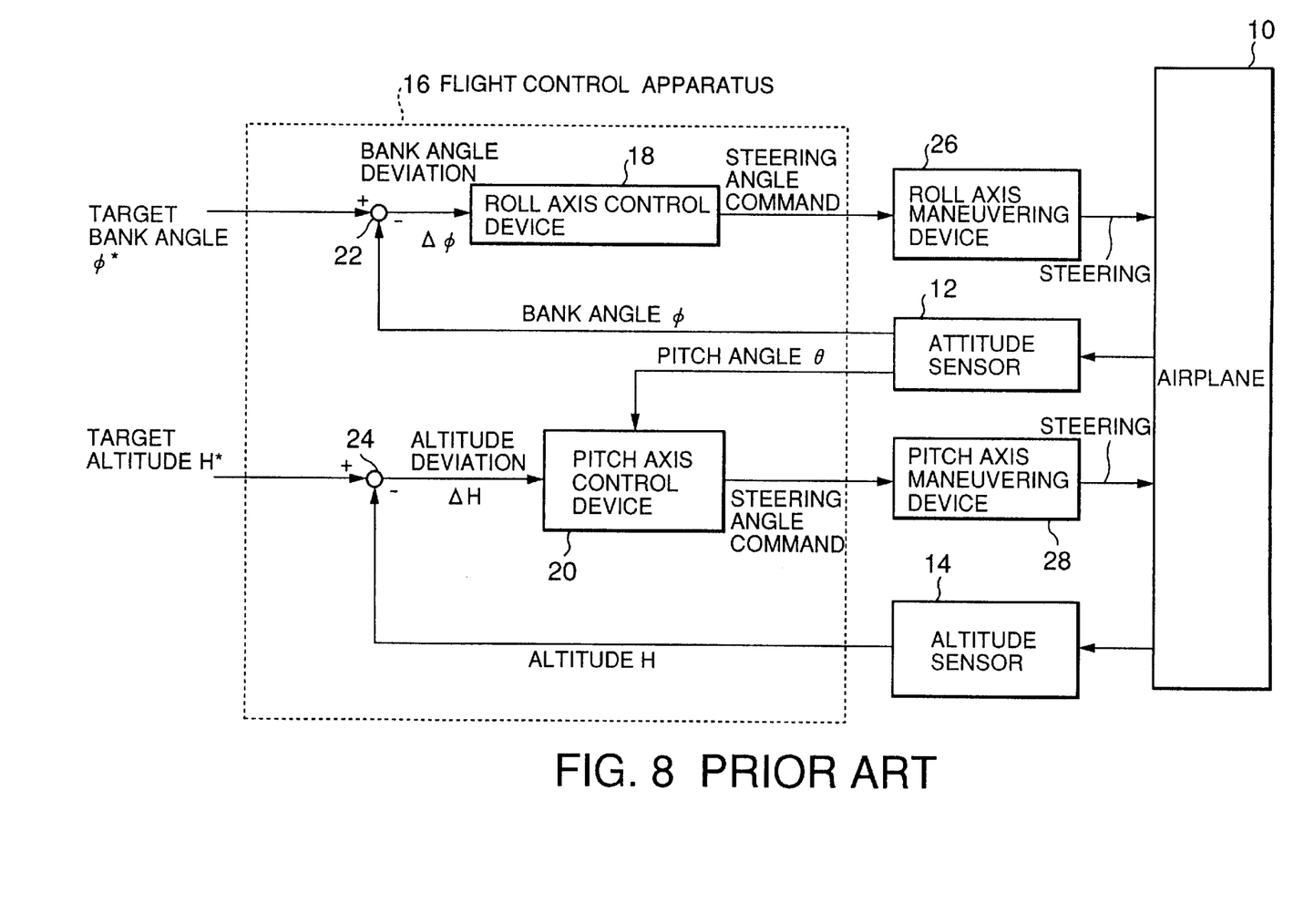
FIG. 8 is a block diagram illustrating a prior art flight control system.

An altitude, a vertical flight path angle and a speed are controlled through changing the flight path angle by typically operating a pitch axis control device such as an elevator, etc. enough to cause rotation about a pitch axis, thus changing an elevator angle, increasing or decreasing a lift along with the change and thereby obtaining an acceleration in a perpendicular direction of the airplane. For example, JP-A-61-196896 discloses a flight control under which a turn is carried out by holding a designated bank angle while holding the altitude by this system. FIG. 8 shows this known system.

Referring to FIG. 8, an attitude sensor 12 detects an attitude of an airplane 10 to be controlled. An altitude sensor 14 detects an altitude thereof. Outputs of these detections are input to a flight control apparatus 16. The attitude sensor 12 detects a bank angle $\phi$ and a pitch angle $\theta$ of the airplane 10. The bank angle $\phi$ is given as a feedback quantity to a bank angle control system, and the latter pitch angle $\theta$ is given as a pitch angle correction quantity to an altitude control system. The flight control apparatus 16 includes a roll axis control device 18 and a pitch axis control device 20. The roll axis control device 18 obtains a roll axis steering angle command as a manipulated variable to reduce a deviation $\Delta\phi$ ($=\phi^*-\phi$) of the bank angle $\phi$ from a target bank angle $\phi^*$ obtained by a comparing unit 22 to zero. A roll axis is controlled in dependency on the roll axis steering angle command through a roll axis maneuvering device 26, e.g., an aileron. The pitch axis control device 20 obtains a pitch axis steering angle command as a manipulated variable to reduce a deviation $\Delta H$ ($=H^*-H$) of a real altitude H from a target altitude $H^*$ obtained by a comparing unit 24 to zero with reference to the pitch angle $\theta$. A pitch axis is controlled in dependency on the pitch axis steering angle command through a pitch axis maneuvering device 28 with reference to the pitch angle $\theta$, e.g., an elevator.

The above publication further discloses the system, wherein a feedback gain of the bank angle control system is increased when the real altitude decreases under the target altitude which might happen during a steep turn while controlling the altitude by controlling the pitch axis as well as controlling the bank angle by controlling the roll axis. The bank angle is thereby decreased to enhance the lift in the perpendicular direction, and an altitude recovery function is thus enhanced.

Figure 9:
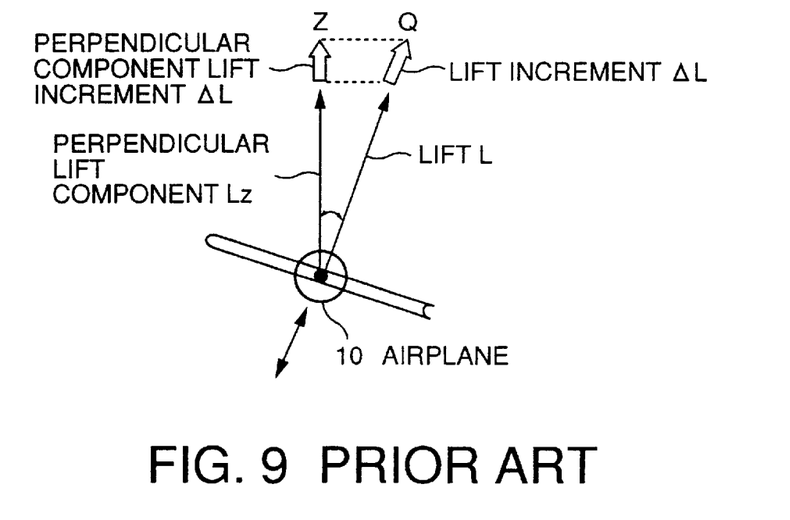
FIG. 9 is an explanatory diagram showing how a lift increases and decreases in a gentle turn having a small bank in the air plane.

The vertical direction of the airplane 10, i.e., a lift axis Q is close to a perpendicular axis, i.e., an altitude direction Z as illustrated in FIG. 9 in a wing level straight flight of the airplane and a gentle turn at a small bank angle $\phi$. It is therefore possible in the prior art to obtain a perpendicular component $\Delta Lz$ for acquiring an acceleration with respect to a perpendicular lift component Lz to sustain an airplane weight, i.e., a lift component in the altitude direction Z by increasing and decreasing a lift increment $\Delta L$ for a lift L in the direction of the lift axis Q.

Figure 10:
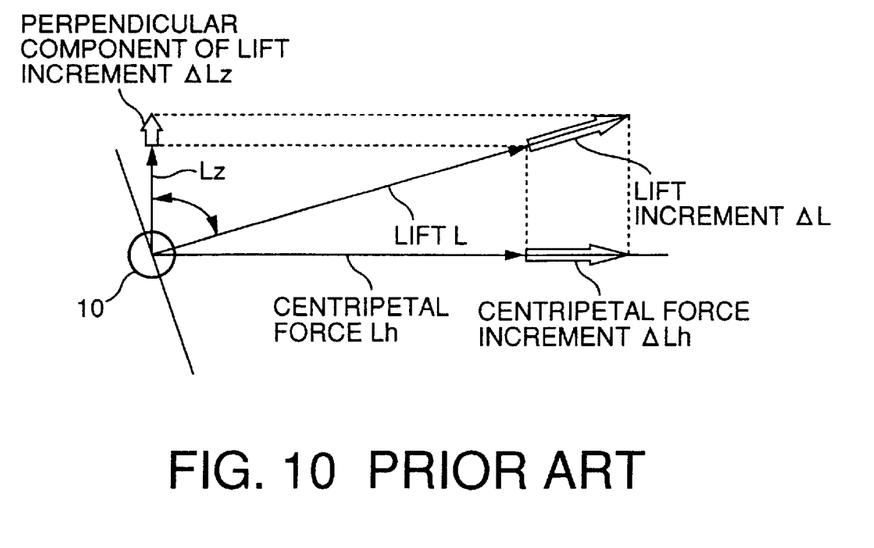
FIG. 10 is an explanatory diagram showing how the lift increases and decreases in a steep turn having a large bank in the airplane.

The lift axis Q is inclined as close to horizontal as illustrated in FIG. 10 on the occasion of high maneuvering as in case of a steep turn taking a large bank angle $\phi$. Hence, there must be largely increased and decreased lift increment $\Delta L$ in the direction of the lift axis Q corresponding to the perpendicular lift component $\Delta Lz$ for obtaining the acceleration in the altitude direction Z to control the altitude. Note that a horizontal component Lh of the lift L acts as a centripetal force, and a horizontal component $\Delta Lh$ of the lift increment $\Delta L$ acts as an increment of the centripetal force to change a turn radius in FIG. 10.

First, when the control device has to be operated larger than in the straight flight or the gentle turn, e.g., when performing the high maneuvering as in case of the steep turn taking the large bank angle $\phi$, the same control effects can not be obtained. Further, a high control accuracy is not necessarily required only for the altitude and the speed control in case of the turn. The turn acceleration of an unmanned plane is required to be held precisely to a predetermined value when turning and evading the unmanned target plane for the purpose of evaluating a target tracking capability of, e.g., for evading a missile pursuit. It is also required that the turn around a ground target object must be carried out while keeping the turn radius constant in the flight control of the airplane observing the ground target object.

The turn acceleration proportional to the lift largely changes, and further the turn radius is liable to change because of the turn centripetal force defined as a horizontal component of the lift being largely varying in the prior art system requiring largely increasing and decreasing the lift to control the altitude. Accordingly, second, it is difficult to make holding the altitude and the flight path angle compatible to holding the turn acceleration and the turn radius in the prior art system.

Next, there will be considered the control accuracy in a steady state of being stabilized at a fixed bank angle, altitude and speed.

For the purpose of attaining the steady turn at the turn acceleration set by the prior art control system as shown in FIG. 8, a desired turn acceleration is attained by inputting the bank angle command determined by the following relational formula:

$$N = 1/\cos \phi \tag{1}$$

where N is the turn acceleration in the steady turn, and $\phi$ is the bank angle. In this case, if the attitude sensor 12 has a detection error, the bank angle to be realized is different from the command value, corresponding to this error, and it follows that the turn acceleration to be realized has an error for the set value. If there is an angular error on the order of 2.0° when making a 2G turn wherein N=2.0, and $\phi$=60.0°, what is in fact realized is: $\phi$=62.0°, and N=2.13. In this case, the error in the turn acceleration N is not so large. If the target is: N=5.0, and $\phi$=78.46°, however, what is in fact realized is: $\phi$=80.46°, and N=6.04. The error in the turn acceleration N exceeds 1G, and a large error in the turn acceleration is caused for a slight error in the bank angle as the turn gets steeper.

Accordingly, third, it is difficult to carry out the steep turn at a high accuracy according to the prior art system, wherein the turn acceleration is designated.

Furthermore, it is known that the altitude control by the pitch axis control device becomes hard in a region called a backside in which the speed of the airplane is slow enough to be under about 1.5 times the stalling speed although there is some latitude depending on the characteristics of each airplane. It is assumed that the airplane enters the backside at a higher speed especially in the steep turn than in the straight flight and the gentle turn. Accordingly, fourth, there is such a problem that the steep turn is hard to carry out at a low speed, with difficulty controlling the altitude in the prior art control system.

The recovery function lowering with only the increase and decrease in the lift when the altitude goes down in the conventional manner, is enhanced by reducing the inclination of the lift axis as a bank angle decreased and by incrementing the perpendicular component of the lift in JP-A-61-196896. According to this system however, the two kinds of control functions through the pitch axis and the roll axis and are applied to holding the altitude, and therefore can not correspond to other control purposes such as holding the turn acceleration and the turn radius. Further, the altitude is controlled by controlling the pitch axis, and hence the difficulty for use in the backside remains unchanged.

That is, the prior art cited herein gives a solution for the first problem described above but can not provide any solutions for the second, third and fourth problems.

SUMMARY OF THE INVENTION

A primary object of the present invention is to provide a flight control system for an airplane, which is capable of enhancing respondences and accuracies of controlling an altitude and a flight path angle or a speed in a steep turn taking a large bank angle, and thereby eliminating fluctuation in turn acceleration that is peculiar to controlling the altitude and the flight path angle.

For this purpose, a flight control system for an airplane according to the present invention comprises a roll axis maneuvering device for controlling a rolling motion of the airplane, a pitch axis maneuvering device for controlling a pitching motion of the airplane, an altitude sensor for detecting an altitude of the airplane, and an attitude sensor for detecting various angles including a bank angle of the airplane. The flight control system further comprises a vertical acceleration sensor for detecting a vertical acceleration of the airplane and for generating a vertical acceleration signal, a vertical acceleration control device responsive to the vertical acceleration signal for calculating an acceleration deviation of the acceleration from a target turn acceleration and a pitch axis steering angle command for reducing the acceleration deviation to zero and for transmitting the pitch axis steering angle command to the pitch axis maneuvering device, a reference bank angle calculating device responsive to a target turn acceleration command for calculating a reference bank angle and for generating a reference bank angle signal, an altitude control device responsive to the altitude for calculating an altitude deviation of the airplane from a target altitude and a bank angle correcting quantity from the altitude deviation and for generating a bank angle command signal by correcting the reference bank angle signal using the bank angle correction quantity, and a roll axis control device responsive to the bank angle command signal for calculating a bank angle deviation of the bank angle from the bank angle command and roll axis steering angle command for reducing the bank angle deviation to zero and for transmitting the roll axis steering angle command to the roll axis maneuvering device as a manipulated variable so as to attain a precise control of said airplane with high response ability and accuracy.

The flight control system according to the present invention further comprises an airplane position sensor for detecting an airplane position, a horizontal distance calculating device responsive to a ground target position and the airplane position for calculating a horizontal distance from a ground target, and a turn radius control device responsive to a difference between the horizontal distance and a target turn radius for obtaining an acceleration correcting quantity and for correcting the target turn acceleration by using the acceleration correcting quantity.

Further, a flight control system according to the present invention comprises a roll axis maneuvering device for controlling a rolling motion of the airplane, a pitch axis maneuvering device for controlling a pitching motion of the airplane, and an attitude sensor for detecting various angles including a bank angle of the airplane. The flight control system further comprises a vertical acceleration sensor for detecting a vertical acceleration of the airplane and for generating a vertical acceleration signal, a vertical acceleration control device responsive to the vertical acceleration signal for calculating an acceleration deviation of the acceleration from a target turn acceleration and a pitch axis steering angle command for reducing the acceleration deviation to zero and for transmitting the pitch axis steering angle command to the pitch axis maneuvering device, a reference bank angle calculating device responsive to a target turn acceleration command for calculating a reference bank angle and for generating a reference bank angle signal, a speed sensor for detecting a speed of the airplane and for generating a speed signal, a speed control device responsive to the speed signal for calculating a speed deviation of the speed from a target speed and a bank angle correcting quantity from the speed deviation to correct the reference bank angle signal and for generating a bank angle command signal, a roll axis control device responsive to the bank angle command signal for calculating a bank angle deviation of the bank angle from the bank angle command and roll axis steering angle command for reducing the bank angle deviation to zero and for transmitting the roll axis steering angle command to the roll axis maneuvering device as a manipulated variable so as to attain a precise control of the airplane with high response ability and accuracy.

The flight control system according to the present invention further comprises a deviation calculating device responsive to the the airplane position and a target flight course for calculating the position deviation from a target flight course, and a signal switching device for making a switchover so as to obtain a correcting quantity to be added to the reference bank angle to obtain a bank angle command relative to controlling the roll axis in response to the position deviation in accordance with a degree of the reference bank angle when the reference bank angle is small instead of obtaining thereof by the altitude control device and for obtaining a variable relative to controlling the pitch axis in response to the altitude deviation.

The flight control system according to the present invention further comprises a calculating device responsive to a position, an altitude and a speed of the airplane, and a horizontal plane target flight path, a perpendicular plane target flight path and a target speed of the airplane for calculating a horizontal plane acceleration command and a perpendicular plane acceleration command, and a device for converting the horizontal plane acceleration command and the perpendicular plane acceleration command into the bank angle command and the acceleration command, respectively.

BRIEF DESCRIPTION OF THE DRAWINGS

Other objects and advantages of the present invention will become understood from the following discussion in reference with the accompanying drawings, in which.

DESCRIPTION OF THE PREFERRED EMBODIMENTS

Preferred embodiments of the present invention will become understood from the following detailed description referring to the accompanying drawings.

Figure 1:
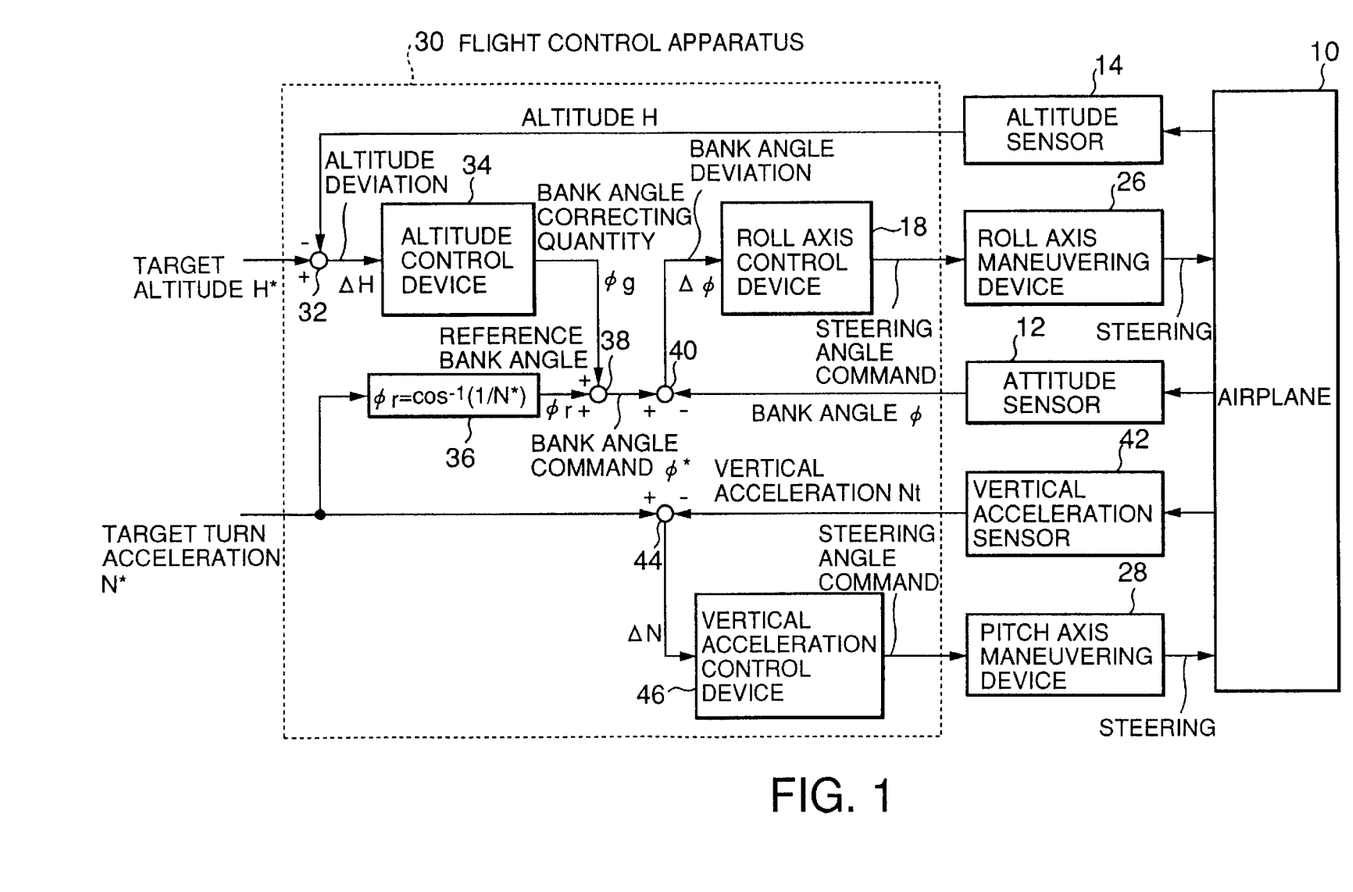
FIG. 1 is a block diagram showing a first embodiment of a flight control system according to the present invention.

FIG. 1 shows a first embodiment of the present invention, which is applied to a case where a turn is carried out while keeping an altitude and a turn acceleration. A comparing unit 32 obtains an altitude deviation $\Delta H$, i.e., a difference between a target altitude $H^*$ and a real altitude $H$ detected by an altitude sensor 14 in a flight control apparatus 30 which will herein be explained. An altitude control device 34 executes an altitude control process thereon and outputs a bank angle correcting quantity $\phi g$. A reference bank angle calculating device 36 calculates a reference bank angle $\phi r$ from a target turn acceleration $N^*$ in accordance with the following formula:

$$\phi r = \cos^{-1}(1/N^*) \quad (2)$$

An adder 38 adds the bank angle correcting quantity $\phi g$ obtained by the device 34, to the thus calculated reference bank angle $\phi r$, thereby obtaining a bank angle command $\phi^*$.

A comparing unit 40 obtains a difference between the bank angle command $\phi^*$ and a real bank angle $\phi$ detected by an attitude sensor 12, and the difference is set as a bank angle deviation $\Delta \phi$. A roll axis control device 18 obtains a roll axis steering angle command for reducing the bank angle command deviation $\Delta \phi$ to zero. This steering angle controls a steering angle of a roll axis through a roll axis maneuvering device 26, e.g., aileron.

On the other hand, a vertical acceleration sensor 42 detects a real vertical acceleration $Nt$ of an airplane 10, and the comparing unit 44 obtains an acceleration deviation $\Delta N$, viz., a difference between the vertical acceleration $Nt$ and the target turn acceleration $N^*$. A vertical acceleration control device 46 executes a control process to reduce the acceleration deviation $\Delta N$ to zero, thereby obtaining a pitch axis steering angle command. A steering angle of the pitch axis is controlled in dependency on the steering angle command through a pitch axis maneuvering device 28, e.g., an elevator.

Figure 2:
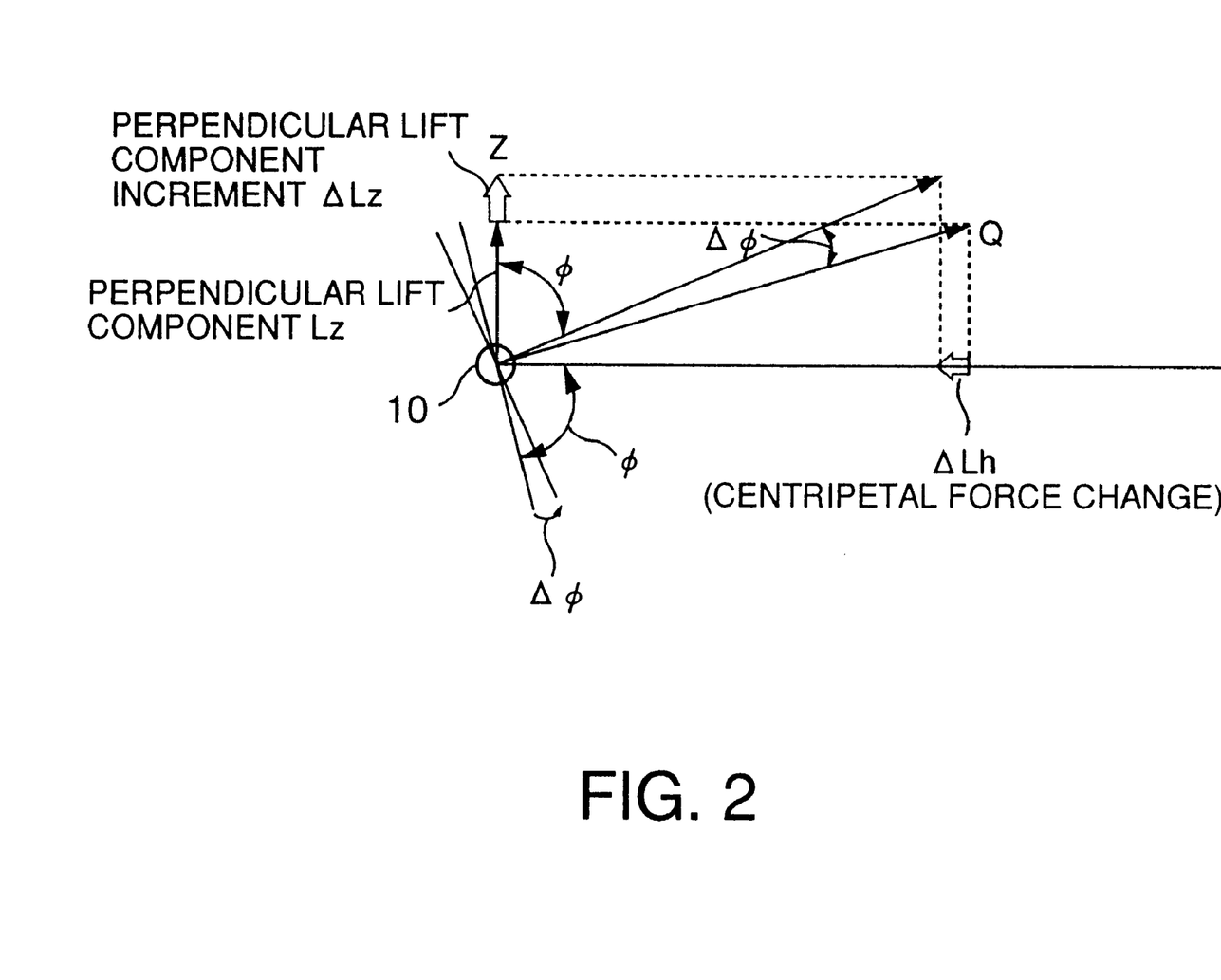
FIG. 2 is an explanatory diagram showing how a bank angle is increased and decreased in a steep turn having a large bank in an airplane.

According to the system shown in FIG. 1, the roll axis maneuvering device 26 is operated to change an inclination of a lift axis Q by controlling the bank angle $\phi$ as illustrated in FIG. 2 and thereby obtains a desired perpendicular acceleration ($\Delta Lz$), thus controlling the altitude when making a steep turn and a vertical flight path angle or a speed through the flight path angle. With this operation, there are enhanced a response ability and an accuracy of controlling the altitude and the flight path angle or the speed by making use of most characteristics of the steep turn to obtain the desired perpendicular acceleration ($\Delta Lz$) with a slight bank angle variation $\Delta \phi$ because of the lift axis Q being inclined close to horizontal. Besides, it is feasible to obviate the above first and second problems inherent in the prior art control system by eliminating fluctuations in the turn acceleration, which are peculiar to controlling the altitude and the flight path angle. Further, the pitch axis is applied to controlling the vertical acceleration $Nt$ of the airplane body separately from controlling the altitude and the flight path angle. The turn acceleration and a turn radius can be thereby held without being hindered by the control of the altitude and the flight path angle as well. The turn acceleration can be thus directly controlled, and hence the third problem described above can be solved.

Moreover, there is no problem in terms of backside, and there can be facilitated the altitude control down to a low speed region just before stalling, whereby the fourth problem can be solved.

Moreover, as the pitch axis maneuvering device 28 can also control the altitude, the flight path angle and the speed by controlling the pitch axis, it can be used to switch over a conventional flight control system suitable for a gentle turn or a straight flight to keep a flight course by controlling the roll axis with the roll axis maneuvering device 26, or a steep turn control system in accordance with a degree of the bank angle $\phi$, respectively. Thus, it is possible to correspond to each of the straight flight, the gentle slight turn and the steep turn.

Further, the perpendicular and horizontal accelerations required for guiding the airplane on a target flight course are converted into an airplane axis vertical acceleration command and a bank angle command $\phi^*$ in the control device for controlling the bank angle $\phi$ and the vertical acceleration $Nt$ of the airplane by the roll axis control system and the pitch axis control system. Then, these commands are inputted as the control target values to the control device, thereby making it feasible to perform the target course to keep controlling at a high accuracy along the required flight course including straight flight, turning, rising and lowering.

Figure 3:
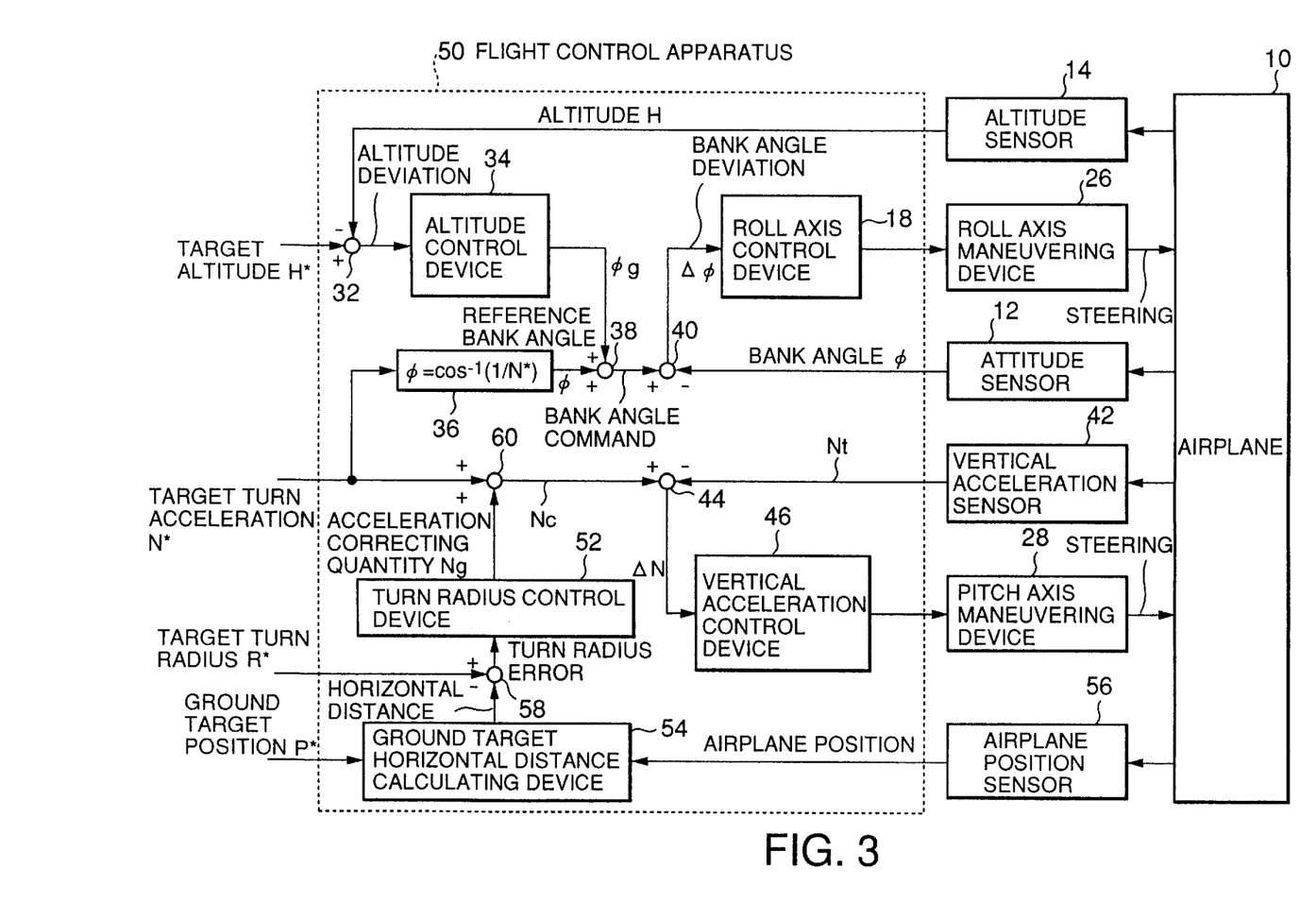
FIG. 3 is a block diagram showing a second embodiment of the flight control system of the present invention.

FIG. 3 shows a second embodiment suitable for making a turn while keeping constant the altitude and the turn radius about a ground target.

A flight control apparatus 50 in the second embodiment is characterized by adding a turn radius control device 52 and a ground target horizontal distance calculating device 54 to the system 30 shown in FIG. 1. Herein, the value of the target turn acceleration N* is not fixed unlike the embodiment shown in FIG. 1. The ground target horizontal distance calculating device 54 calculates a horizontal distance from an airplane position, detected by an airplane position sensor 56 such as a navigation device, etc., to a ground target position P*. Then, a comparing unit 58 obtains a turn radius error, i.e., an error with respect to a target turn radius R* thereof. A turn radius control device 52 obtains a vertical acceleration correcting quantity Ng in dependency on the turn radius error. The vertical acceleration correcting quantity is added for modification to the target turn acceleration N*, thereby obtaining an acceleration command Nc. A steering angle of the pitch axis is controlled through the vertical acceleration control device 46 and the pitch axis maneuvering device 28 so that the vertical acceleration Nt detected by the vertical acceleration sensor 42 is coincident with the acceleration command Nc.

The acceleration is controlled by the control system in such a way that the acceleration is increased when receiving a tail wind but is decreased when receiving a head wind, whereby the turn radius can be kept constant.

Figure 4:
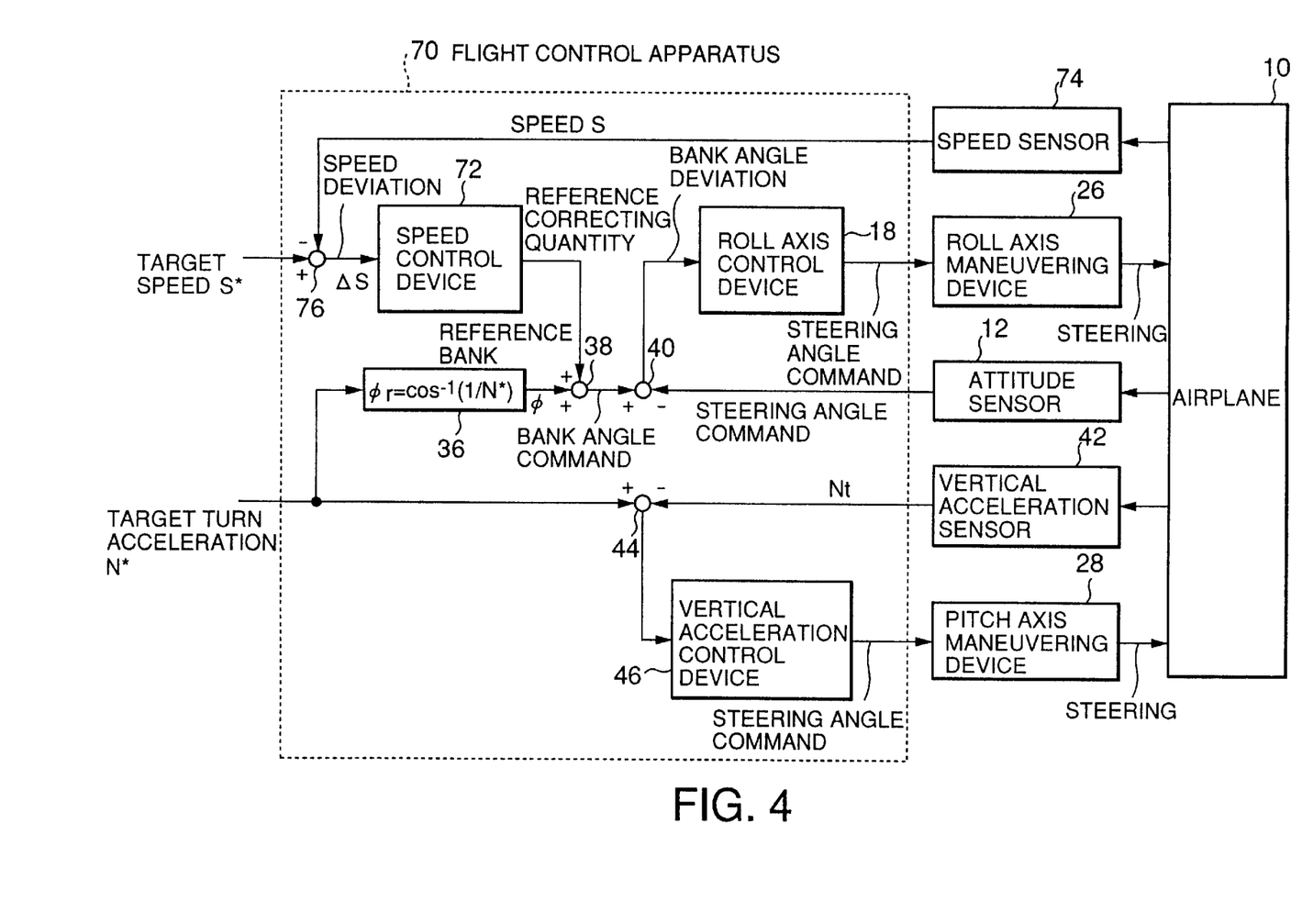
FIG. 4 is a block diagram showing a third embodiment of the flight control system of the present invention.

FIG. 4 shows a preferred embodiment suitable for a case where the turn is carried out while keeping the speed and the turn acceleration constant.

This embodiment is characterized by providing a speed control device 72 as a substitute for the altitude control device 34 in the system shown in FIG. 1. A comparing unit 76 obtains a speed deviation $\Delta S$, i.e., a difference between a real speed S detected by a speed sensor 74 and a target speed S*. The speed control device 72 obtains a bank angle correcting quantity for reducing this speed deviation $\Delta S$ to zero. This embodiment is effective where a lowering turn is carried out while keeping the speed and the turn acceleration constant under such a flight condition that an altitude keeping turn lacks an engine thrust, or in a non-powered plane like a glider, etc.

Figure 5:
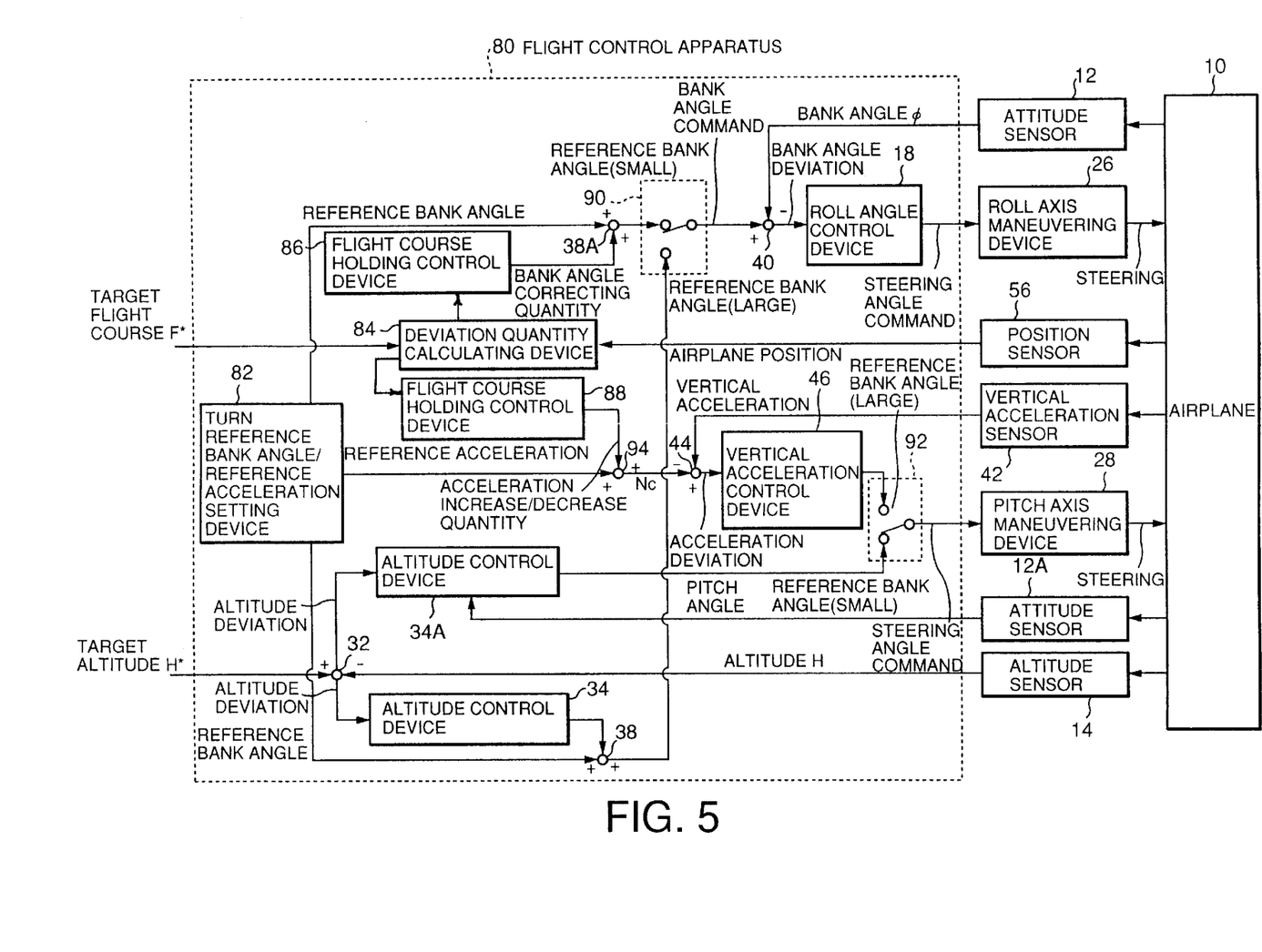
FIG. 5 is a block diagram showing a fourth embodiment of the flight control system of the present invention.
Figure 6:
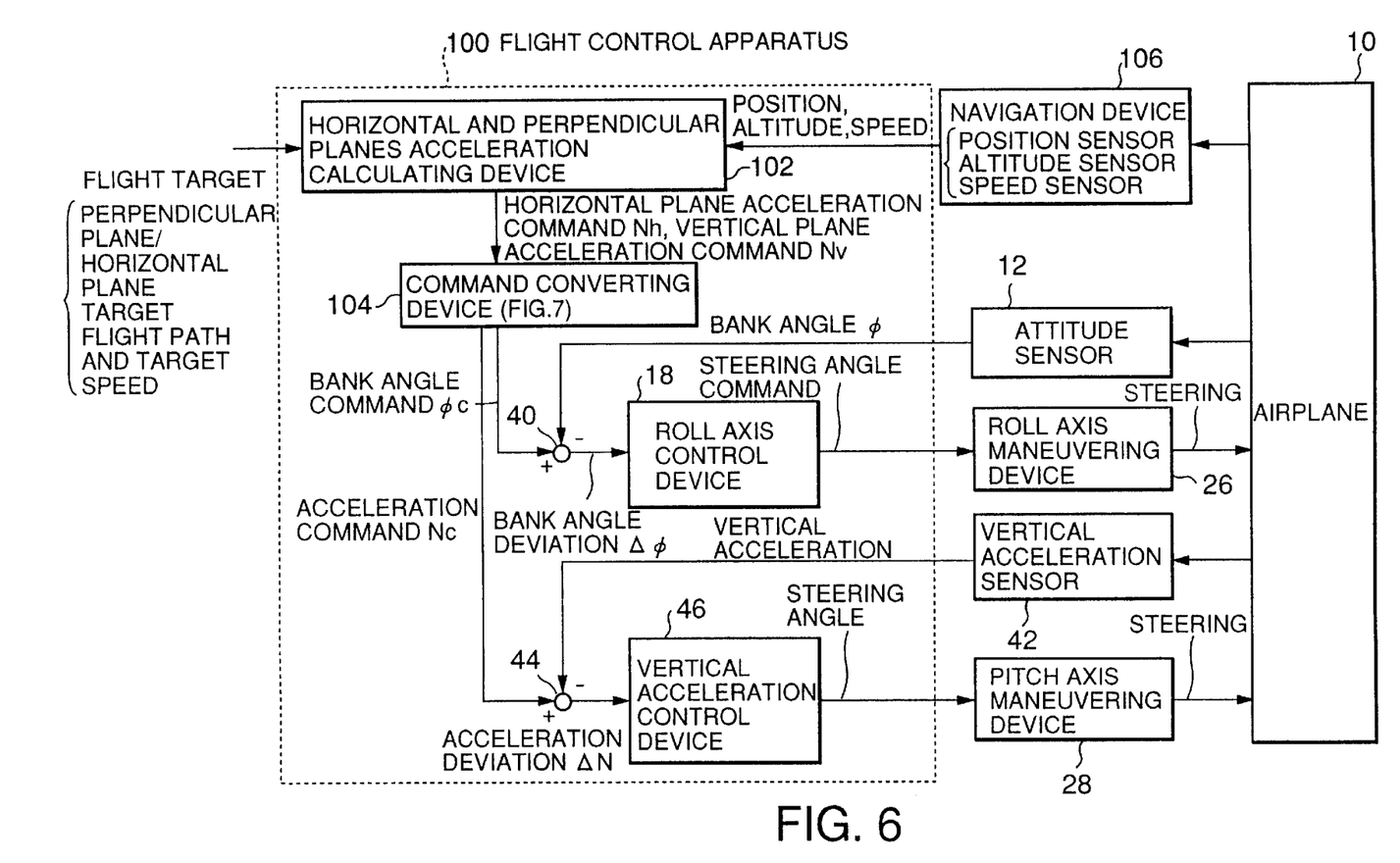
FIG. 6 is a block diagram showing a fifth embodiment of the flight control system of the present invention.

FIGS. 5 and 6 show examples of a construction for utilizing the whole control.

FIG. 5 shows an example where the steep turn control system according to the present invention and the conventional control system suitable for the straight flight and the gentle turn, are so used as to be switched exchangeable over depending on the degree of the bank angle.

A flight control apparatus 80 in FIG. 5 is exemplified to hold the altitude and the flight course, wherein the same components as those in FIG. 1 or 3 are marked with the same numerals. There is provided an attitude sensor 12A for detecting a pitch angle of the airplane. A target altitude H* and a target flight course F* are introduced as target values. Then, there are additionally provided a turn reference bank angle/reference acceleration setting device 82 for setting a reference bank angle and a reference acceleration when turned, a deviation calculating device 84 for calculating a deviation of an airplane position detected by the position sensor 56 from the target flight course F*, flight course holding control devices 86, 88, and signal switching units 90, 92 other than a second altitude control device 34A.

The signal switching units 90, 92 are so controlled as to be switched based on an output of the setting device 82 in accordance with a degree of the reference bank angle set by the setting device 82.

The control device 86 obtains such a bank angle correcting quantity as to eliminate the deviation in dependency on the deviation calculated by the deviation calculating device 84 in the roll axis control system when the reference bank angle is small, i.e., when the straight flight or the gentle slight turn is carried out. The reference bank angle is modified by the bank angle correcting quantity through an adder 38A. The bank angle $\phi$ is controlled with the thus modified reference bank angle serving as a bank angle command, and a steering angle of the roll axis is controlled through the roll axis control device 18 and the roll axis maneuvering device 26. The altitude control device 34A obtains a steering angle command in dependency on a real pitch angle given from the attitude sensor 12A as well as on an altitude deviation given from the comparing unit 32, and a steering angle of the pitch axis is controlled through the pitch axis maneuvering device 28 in the pitch axis control system.

If the reference bank angle is large, the system can be substantially switched to the control system shown in FIG. 1, and the control suited to the steep turn can be executed. More specifically, the control device 34 obtains such a bank angle command as to eliminate the altitude deviation in dependency on the altitude deviation, and the steering angle of the roll axis is controlled through the roll axis control device 18 and the roll axis maneuvering device 26 to reduce to zero the bank angle deviation obtained as a difference between the bank angle command and the real bank angle in the roll axis control system. The reference acceleration N* from the setting device 82 is so modified as to be added by an adder 94 with an acceleration increment/decrement quantity obtained by the deviation calculating device 84 and the control device 88, and thus set as an acceleration command Nc, and a steering angle of the pitch axis is controlled through the vertical acceleration control device 46 and the pitch axis maneuvering device 28 so that the vertical acceleration detected by the sensor 42 is coincident with the acceleration command Nc in the pitch axis control system.

It is feasible to correspond to any of the straight flight, the gentle slight turn and the steep turn by switching, in accordance with the degree of the bank angle, the steep turn control system of the present invention and the conventional flight control system suitable for the straight flight or the gentle slight turn, wherein the altitude, the flight path angle and the speed are thus controlled by controlling the pitch axis, and the flight course is held by controlling the roll axis.

Further, FIG. 6 illustrates a flight control apparatus 100, wherein a perpendicular plane (perpendicular direction) acceleration command Nv and a horizontal plane (horizontal direction) acceleration command Nh, each required to set an airplane 10 on a target flight course, are converted into an airplane axis vertical acceleration commands and a bank angle command, these command being given as target inputs to the control system for controlling the bank angle and the airplane axis perpendicular acceleration with the roll- and pitch-axis control systems. The flight control apparatus 100 illustrated therein includes a perpendicular/horizontal plane acceleration calculating device 102 and a command converting device 104. A navigation device 106 includes the position sensor, the altitude sensor and the speed sensor. The navigation device 106 detects a position, an altitude and a speed of the airplane 10, and detected results thereof are inputted to the acceleration calculating device 102. A target speed and a target flight path of the perpendicular/horizontal planes are also inputted to the calculating device 102, corresponding to the detected results inputted thereto. Then, the calculating device 102 calculates the horizontal plane acceleration command Nh and the perpendicular plane acceleration Nv in dependency on the target value and the real value (see FIG. 7).

Figure 7:
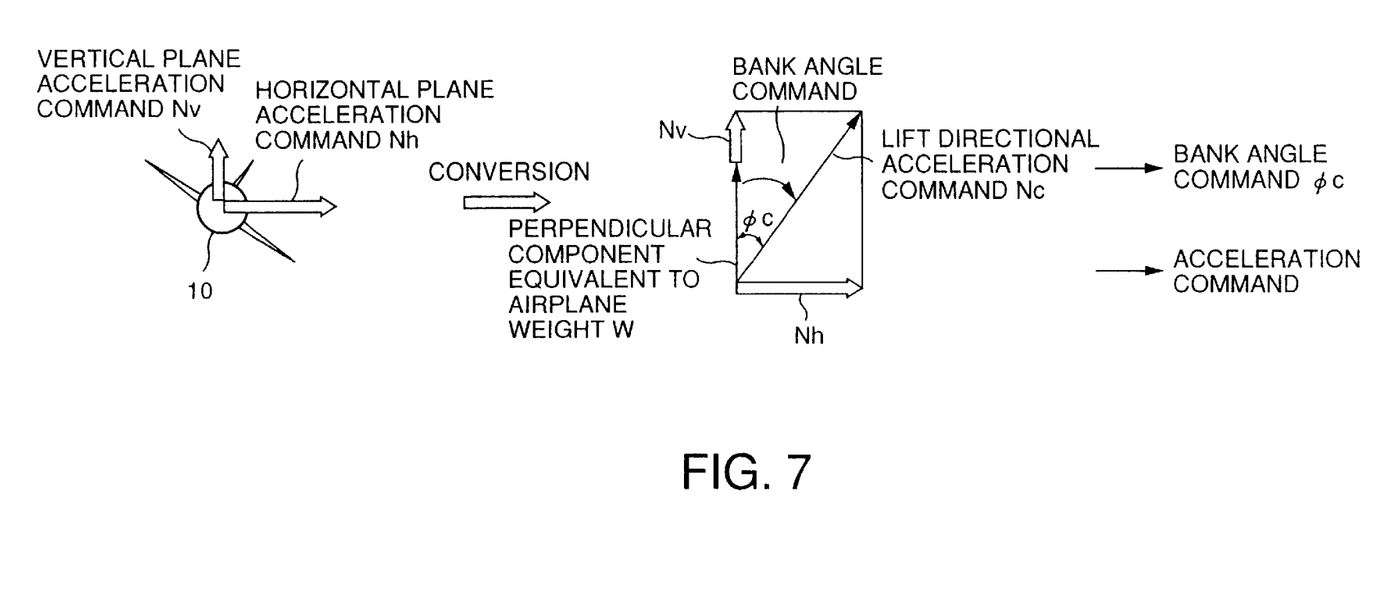
FIG. 7 is an explanatory diagram showing an operation of a command converting device in the control system in FIG. 6.

The acceleration commands Nh, Nv are converted into an acceleration command Nc and a bank angle command $\phi c$ by the command converting device 104. The command converting device 104, as shown in FIG. 7, sets the horizontal plane acceleration command Nh and the perpendicular plane acceleration command Nv into two vector components relative to x- and y-axis components, adds an acceleration component W equivalent to an airplane weight to the perpendicular plane acceleration command Nv to set it as a y-axis component, i.e., a perpendicular component (=Nv+W), sets a vector sum of this perpendicular component and an x-axis component, viz., the horizontal plane acceleration command Nh into a lift directional acceleration command Nc, and sets an angle made by the perpendicular component (=Nv+W) and the lift directional acceleration command Nc as a bank angle command $\phi c$.

The roll axis and the pitch axis are hereinbelow controlled according to what has been described in detail with respect to the system shown in FIG. 1 by using the thus obtained acceleration command Nc and bank angle command $\phi c$.

This system has such a characteristic that the target course holding control along an arbitrary flight course including the straight flight, turning, rising and lowering can be implemented at a high precision without switching the control signal by converting the perpendicular and horizontal accelerations needed to set the airplane on the target flight course into the airplane axis vertical acceleration command and the bank angle command, and by controlling the roll axis and the pitch axis with the commands serving as the control target values in the control system for controlling the bank angle and the airplane axis vertical acceleration with the roll- and pitch-axis control systems.

The respective boxes constituting the flight control arithmetic system have been explained as if being the analog circuit devices independent of each other in the embodiments discussed above. However, some or the whole of those functions can be realized by software of a microcomputer.

As described above in greater detail, the altitude control in the steep turn and the vertical flight path angle control or the speed control through the flight path angle are carried out by operating the roll axis control device, changing the inclination of the lift axis as well as controlling the bank angle, and thereby obtaining a desired perpendicular acceleration. With this operation, the respondencies and accuracies of controlling the altitude and the flight path angle or the speed are enhanced by making use of the characteristic of the steep turn enough to obtain a desired perpendicular acceleration with a slight variation in the bank angle because of the lift axis being tilted close to horizontal. Besides, the above first and second problems inherent in the prior art control system can be obviated by eliminating the fluctuations in the turn acceleration which are peculiar to controlling the altitude and the flight path angle. Further, the pitch axis control device is set separate from controlling the altitude and the flight path angle and applied to controlling the airplane axis vertical acceleration, whereby the turn acceleration and the turn radius can be held without being hindered by controlling the altitude and the flight path angle. The turn acceleration can be thereby directly controlled, and hence the third problem can be solved. Moreover, the pitch axis control device is not used for controlling the altitude, and therefore no backside problem arises. The altitude down to the lower speed region just before stalling can be facilitated, whereby the fourth problem can be solved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A flight control system for an airplane, having a roll axis maneuvering device for controlling a rolling motion of the airplane, a pitch axis maneuvering device for controlling a pitching motion of the airplane, an altitude sensor for detecting an altitude of the airplane, and an attitude sensor for detecting various angles including a bank angle of the airplane, comprising:

a vertical acceleration sensor for detecting a vertical acceleration of the airplane and for generating a vertical acceleration signal;

vertical acceleration control means responsive to said vertical acceleration signal for calculating an acceleration deviation of the acceleration from a target turn acceleration and a pitch axis steering angle command for making said acceleration deviation to zero and for transmitting the pitch axis steering angle command to said pitch axis maneuvering device;

reference bank angle calculating means responsive to a target turn acceleration command for calculating a reference bank angle and for generating a reference bank angle signal;

altitude control means responsive to said altitude for calculating an altitude deviation of the airplane from a target altitude and a bank angle correcting quantity from said altitude deviation and for generating a bank angle command signal by correcting said reference bank angle signal using said bank angle correction quantity; and roll axis control means responsive to said bank angle command signal for calculating a bank angle deviation of said bank angle from the bank angle command and roll axis steering angle command for making said bank angle deviation to zero and for transmitting the roll axis steering angle command to said roll axis maneuvering device as a manipulated variable so as to attain a precise control of said airplane with high response ability and accuracy.

2. A flight control system for an airplane having a roll axis maneuvering device for controlling a roll motion of the airplane and a pitch axis maneuvering device for controlling a pitch motion of the airplane, the flight control system comprising:

means for generating a reference bank angle signal and a reference acceleration signal based on stored data;

course comparing means for calculating a course deviation by comparing an actual position of the airplane with a target flight course;

course control means responsive to the course deviation for calculating an acceleration correction signal;

altitude comparing means for calculating an altitude deviation by comparing an actual altitude of the airplane with a target altitude;

altitude correction means responsive to the altitude deviation signal for producing an altitude correction signal;

altitude calculating means responsive to the altitude deviation and the actual pitch signal of the airplane for producing an altitude signal;

a course calculating means responsive to said course deviation for calculating a bank angle correcting quantity;

first adding means for adding the bank angle correcting quantity and the reference bank angle signal to produce a first bank angle command signal;

second adding means responsive to the altitude correction signal and the reference bank angle signal for calculating a second bank angle command signal;

first switching means for selecting one of said first and second bank angle command signals;

third adding means for adding said acceleration correction signal and said reference acceleration for producing an acceleration command signal;

vertical acceleration calculating means responsive to said acceleration command signal and an actual vertical acceleration of the airplane for producing a vertical acceleration signal;

second switching means for selecting one of said vertical acceleration signal and said altitude signal for producing a steering angle signal to control said pitch axis maneuvering device; and roll axis control means responsive to the bank angle command signal and an actual bank angle of the airplane for producing a roll axis steering command control to control said roll axis maneuvering device.

* * * * *